(12) United States Patent
Kato et al.

(10) Patent No.: US 10,457,009 B2
(45) Date of Patent: Oct. 29, 2019

(54) HONEYCOMB STRUCTURE

(71) Applicant: NGK INSULATORS, LTD., Nagoya (JP)

(72) Inventors: Yasushi Kato, Nagoya (JP); Takahiro Kondo, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 337 days.

(21) Appl. No.: 15/601,181

(22) Filed: May 22, 2017

(65) Prior Publication Data

US 2017/0355164 A1 Dec. 14, 2017

(30) Foreign Application Priority Data

Jun. 10, 2016 (JP) .................................. 2016-116473

(51) Int. Cl.

| | | |
|---|---|---|
| *B01D 46/24* | (2006.01) | |
| *B01D 3/02* | (2006.01) | |
| *B01D 53/92* | (2006.01) | |
| *B01D 53/00* | (2006.01) | |
| *B29D 99/00* | (2010.01) | |
| *F01N 3/28* | (2006.01) | |

(Continued)

(52) U.S. Cl.
CPC ....... *B31D 3/0207* (2013.01); *B01D 46/2451* (2013.01); *B01D 53/92* (2013.01); *B29D 99/0089* (2013.01); *F01N 3/2828* (2013.01); *B01D 53/00* (2013.01); *B29D 24/00* (2013.01); *F01N 2330/34* (2013.01); *F01N 2330/48* (2013.01); *F01N 2330/60* (2013.01)

(58) Field of Classification Search
CPC .................................................. B01D 46/2451
See application file for complete search history.

(56) References Cited

U.S. PATENT DOCUMENTS

| | | | | |
|---|---|---|---|---|
| 5,456,965 | A | * 10/1995 | Machida | .................. B01J 35/04 |
| | | | | 428/116 |
| 5,641,332 | A | * 6/1997 | Faber | .................. B01D 46/005 |
| | | | | 55/523 |
| 6,764,743 | B2 | 7/2004 | Kato et al. | |

(Continued)

FOREIGN PATENT DOCUMENTS

| | | |
|---|---|---|
| EP | 2 246 107 A1 | 11/2010 |
| JP | 2002-326034 A1 | 11/2002 |

(Continued)

*Primary Examiner* — Amber R Orlando
(74) *Attorney, Agent, or Firm* — Burr & Brown, PLLC

(57) ABSTRACT

A honeycomb structure has partition walls defining a plurality of hexagonal cells the partition walls are constituted by combining standard partition walls having a partition wall thickness in a range smaller than ±10% to an average partition wall thickness of the partition walls, wide partition walls having a partition wall thickness of +10% or more to the average partition wall thickness, and narrow partition walls having a partition wall thickness of −10% or less to the average partition wall thickness, and a non-standard partition wall ratio is in a range of 10% to 30% which is a ratio occupied by a subtotal number of non-standard partition walls obtained by adding the wide partition walls and the narrow partition walls in a total number of the partition walls which is obtained by adding the numbers of the standard partition walls, the wide partition walls and the narrow partition walls.

6 Claims, 4 Drawing Sheets

(51) Int. Cl.
*B29D 24/00* (2006.01)
*B31D 3/02* (2006.01)

(56) References Cited

U.S. PATENT DOCUMENTS

| | | | |
|---|---|---|---|
| 7,056,365 B2 | 6/2006 | Ichikawa et al. | |
| 7,205,559 B2 | 4/2007 | Hamashima et al. | |
| 7,598,471 B2 | 10/2009 | Hamashima et al. | |
| 7,803,447 B2 | 9/2010 | Kondo et al. | |
| 8,808,836 B2* | 8/2014 | Hiratsuka | B01D 46/247 |
| | | | 422/180 |
| 2003/0153459 A1 | 8/2003 | Kato et al. | |
| 2004/0123573 A1* | 7/2004 | Ichikawa | B01D 46/2451 |
| | | | 55/523 |
| 2004/0135515 A1 | 7/2004 | Hamashima et al. | |
| 2004/0206044 A1 | 10/2004 | Kondo et al. | |
| 2007/0164226 A1 | 7/2007 | Hamashima et al. | |
| 2011/0030357 A1* | 2/2011 | Vincent | B01D 46/247 |
| | | | 60/311 |

FOREIGN PATENT DOCUMENTS

| | | |
|---|---|---|
| JP | 2002-326035 A1 | 11/2002 |
| JP | 2003-181233 A1 | 7/2003 |
| JP | 2010-234315 A1 | 10/2010 |

* cited by examiner

HONEYCOMB STRUCTURE

"The present application is an application based on JP-2016-116473 filed on Jun. 10, 2016 with Japan Patent Office, the entire contents of which are incorporated herein by reference."

BACKGROUND OF THE INVENTION

Field of the Invention

The present invention relates to a honeycomb structure, and more particularly, it relates to a honeycomb structure which is for use in an exhaust gas purifying device or the like to trap particulate matter and purify and treat an exhaust gas, which simultaneously exerts both of a high temperature raising performance and a high heat capacity, and which is capable of efficiently perform a purifying treatment of the exhaust gas or the like.

Description of the Related Art

In various fields of cars, chemistry, electric power, iron and steel, and others, a ceramic honeycomb structure which is excellent in heat resistance and corrosion resistance has been employed as a carrier in a catalyst device for use in an environmental measure, collection of specific substances or the like, or as a filter. For example, with reinforcement of regulation on an exhaust gas from a diesel engine or a direct injection type gasoline engine, there is used an exhaust gas purifying device or the like in which a diesel particulate filter (DPF) or a gasoline particulate filter (GPF) using the above honeycomb structure is employed to trap particulate matter (PM) included in the exhaust gas. As a material of the honeycomb structure for use under an atmosphere of a corrosive gas at a high temperature, there is especially suitably used a ceramic material such as silicon carbide (SiC), cordierite or aluminum titanate (AT) which is excellent in heat resistance and chemical stability.

In the DPF or the like, cell surfaces of the honeycomb structure are coated with a catalyst to oxidize and purify the particulate matter. Here, for the purpose of efficiently burning the particulate matter deposited in cells and achieving regeneration of the DPF or the like, it is necessary to immediately raise a temperature of the honeycomb structure up to a temperature to activate the catalyst (an activation temperature), and it is necessary to maintain the activation temperature for a long time. Consequently, it is possible to stabilize a purification efficiency of the DPF or the like which traps the particulate matter and performs a purifying treatment by the catalyst.

However, the exhaust gas emitted from the diesel engine might not reach the activation temperature of the catalyst, in a case of an operation at a comparatively low exhaust temperature and further in a low load state. Furthermore, also in the gasoline engine, it is necessary to more immediately raise the temperature up to the activation temperature of the catalyst even at start of the engine in a case of an operation of the engine in the low load state. On the other hand, also in a case of an operation of the engine in a high load state, when the state rapidly shifts to the low load state, the temperature of the honeycomb structure immediately lowers to be not more than the activation temperature of the catalyst. That is, the purification efficiency might deteriorate because a heat capacity of the honeycomb structure is low.

To eliminate such a problem, for the purpose of improving a temperature raising performance, a partition wall thickness of partition walls constituting the honeycomb structure is decreased or a porosity is increased. However, the above technique has the problem that the heat capacity of the honeycomb structure further decreases. Furthermore, the decrease of the partition wall thickness has the problem that a mechanical strength of the honeycomb structure remarkably decreases. As a result, in a canning operation of canning and attaching the honeycomb structure into a can member, a strong external force is applied to the honeycomb structure, thereby causing the fear that cracks and the like are easily generated in the partition walls. Consequently, there increases the possibility that the honeycomb structure breaks.

On the other hand, in a case where the honeycomb structure is constituted of the partition walls using a material having a high heat capacity, the problem that the temperature lowers rapidly from a high temperature time is eliminated, but there is the fear that the temperature raising performance to reach the activation temperature from the start of the diesel engine or the like remarkably deteriorates. That is, the high temperature raising performance and the high heat capacity are contradictory to each other.

Thus, for the purpose of improving the strength of the honeycomb structure and eliminating disadvantages in the canning operation, it has already been suggested that a partition wall thickness of partition walls defining cells of a honeycomb structure is suitably changed to arrange regions having large and small partition wall thicknesses in one honeycomb structure.

For example, there has been suggested that a thickness of partition walls defining cells positioned in the vicinity of a circumferential wall of a honeycomb structure is adjusted to be larger than that of partition walls defining cells positioned in another region (see Patent Document 1). Furthermore, for the purpose of avoiding erosion of a part of the honeycomb structure which comes in contact with a high-temperature exhaust gas, there has been suggested a honeycomb structure in which a partition wall thickness of partition walls of a region directly hit by the exhaust gas is increased (see Patent Document 2). Consequently, it is possible to improve a strength of a part of the honeycomb structure, and it is possible to eliminate disadvantages especially in a canning operation.

Alternatively, there has been suggested a honeycomb structure in which in partition walls defining quadrangular cells, there is increased a partition wall thickness of the respective partition walls formed along one axis (e.g., an X-axis) in axial directions (the X-axis and a Y-axis) of the partition walls (see Patent Document 3), and there has been suggested a honeycomb structure in which in partition walls defining quadrangular cells, the partition walls having two types of partition wall thicknesses are uniformly arranged linearly (see Patent Document 4).

[Patent Document 1] JP-A-2002-326034
[Patent Document 2] JP-A-2002-326035
[Patent Document 3] JP-A-2003-181233
[Patent Document 4] JP-A-2010-234315

SUMMARY OF THE INVENTION

However, the above honeycomb structures might raise problems in respects mentioned below. That is, the honeycomb structure described in Patent Document 1 has been suggested mainly for the purpose of improving a strength during canning, whereas the honeycomb structure described in Patent Document 2 has been suggested mainly for the purpose of improving an erosion resistant performance. Therefore, even when a partition wall thickness of partition walls is changed in each of the honeycomb structures, the honeycomb structure does not exert effects due to a high temperature raising performance and a high heat capacity. Consequently, a high purification performance of an exhaust gas or the like is not stably maintained.

On the other hand, the honeycomb structure described in Patent Document 3 has been suggested for the purpose of improving a strength in a specific direction, and a partition wall thickness of linearly positioned partition walls is increased. Therefore, needless to say, the improvement of the strength (a shearing strength) in the direction in which the partition wall thickness is increased is recognized, but the strength in another direction remarkably deteriorates. Furthermore, the purification performance does not sufficiently improve.

Furthermore, as described in Patent Document 4, a honeycomb structure in which partition walls having large and small partition wall thicknesses are linearly arranged is capable of exerting a high temperature raising performance and an effect due to a high heat capacity, and improvement of a purification performance is recognized. However, its shearing strength is weak, and there is the possibility that the honeycomb structure breaks during canning.

Thus, the present invention has been developed in view of the above situations, and an object thereof is to provide a honeycomb structure which has both of a high temperature raising performance and a high heat capacity, and also has a high shearing strength and which does not break during canning.

According to the present invention, there is provided a honeycomb structure which achieves the above object.

[1] A honeycomb structure having partition walls defining a plurality of hexagonal cells which possess a hexagonal shape, extend from one end face to the other end face and become through channels for fluid, wherein the partition walls are constituted by combining standard partition walls having a partition wall thickness in a range smaller than ±10% to an average partition wall thickness of the partition walls, wide partition walls having a partition wall thickness of +10% or more to the average partition wall thickness, and narrow partition walls having a partition wall thickness of −10% or less to the average partition wall thickness, and a non-standard partition wall ratio is in a range of 10% to 30% which is a ratio occupied by a subtotal number of non-standard partition walls obtained by adding the wide partition walls and the narrow partition walls in a total number of the partition walls which is obtained by adding the numbers of the standard partition walls, the wide partition walls and the narrow partition walls.

[2] The honeycomb structure according to the above [1], wherein the standard partition walls, the wide partition walls and the narrow partition walls are arranged to be randomly distributed in accordance with a directed arrangement standard in a structure cross section perpendicular to an axial direction of the honeycomb structure.

[3] The honeycomb structure according to the above [1] or [2], wherein the hexagonal cell is defined by a first partition wall pair constituted of a pair of partition walls arranged in parallel with each other, a second partition wall pair constituted of a pair of partition walls which are present at positions shifting as much as an angle of +60° from the first partition wall pair on the basis of a cell center of the hexagonal cell, and a third partition wall pair constituted of a pair of partition walls which are present at positions shifting as much as an angle of −60° from the first partition wall pair on the basis of the cell center of the hexagonal cell, and the average partition wall thickness is an average value of the partition wall thicknesses of the partition walls which are positioned on respective axes of a first virtual axis perpendicular to the first partition wall pair, a second virtual axis perpendicular to the second partition wall pair, and a third virtual axis perpendicular to the third partition wall pair, in the hexagonal cell close to a gravity central position of the honeycomb structure.

[4] The honeycomb structure according to the above [2] or [3], wherein in the arrangement standard, three consecutive partition walls arranged on the respective axes of the first virtual axis, the second virtual axis and the third virtual axis include at least one standard partition wall.

[5] The honeycomb structure according to any one of the above [1] to [4], wherein the non-standard partition wall ratio is obtained by calculating a subtotal number of the non-standard partition walls which is occupied in the total number of the partition walls in a central region of the honeycomb structure which is positioned inwardly as much as at least 20 mm from a circumferential wall of the honeycomb structure.

[6] The honeycomb structure according to any one of the above [3] to [5], wherein in the partition walls positioned on the respective axes of the first virtual axis, the second virtual axis and the third virtual axis, a first average partition wall thickness, a second average partition wall thickness and a third average partition wall thickness in the respective axes are in a range of ±40% to the average partition wall thickness of the partition walls.

A honeycomb structure of the present invention has partition walls defining hexagonal cells, and the wide partition walls and/or the narrow partition walls in which the partition wall thicknesses of the partition walls are different from the average partition wall thickness as much as ±10% or more are included in all the partition walls at a ratio of 10% or more. Consequently, it is possible to improve a temperature raising performance of the honeycomb structure and it is also possible to long maintain a state which is not less than an activation temperature of a catalyst due to a high heat capacity. That is, it is possible to provide the honeycomb structure having both of characteristics which are contradictory to each other.

Furthermore, standard partition walls, the wide partition walls and the narrow partition walls are randomly arranged in accordance with a directed arrangement standard, and hence a shearing strength of the honeycomb structure does not locally decrease. As a result, during canning of the honeycomb structure in a can member, it is possible to avoid generation of disadvantages such as cracks in the honeycomb structure.

DESCRIPTION OF THE PREFERRED EMBODIMENTS

Figure 1:
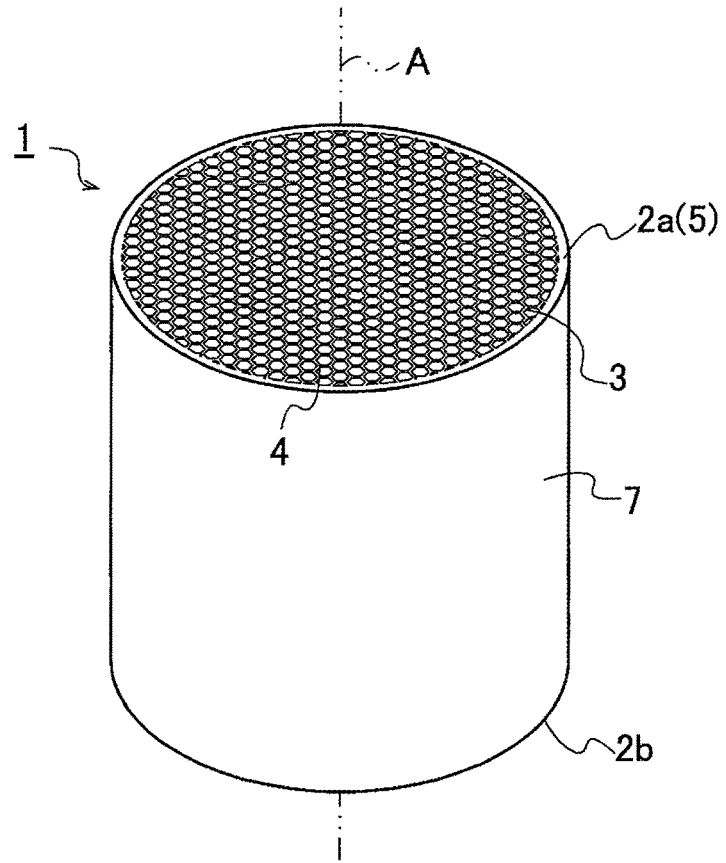
FIG. 1 is a perspective view showing a schematic constitution of a honeycomb structure of the present embodiment.
Figure 2:
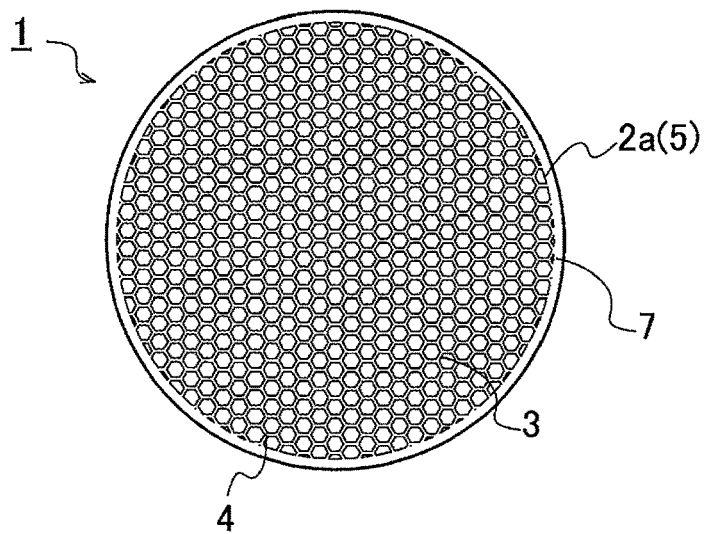
FIG. 2 is a plan view showing the schematic constitution of the honeycomb structure viewed from the upside.

Hereinafter, a honeycomb structure of the present invention will be described in detail with reference to the drawings. It is to be noted that the honeycomb structure of the present invention is not limited to the following embodiment, and various design changes, modifications, improvements and the like are addable without departing from the gist of the present invention.

As shown mainly in FIG. 1 to FIG. 6, a honeycomb structure 1 of the present embodiment has partition walls 4 defining a plurality of hexagonal cells 3 which possess a hexagonal shape, extend from one end face 2a to the other end face 2b and become through channels for fluid. Further specifically, the partition walls 4 are constituted by combining standard partition walls 4a having a partition wall thickness T1 in a range smaller than ±10% to an average partition wall thickness of the partition walls 4, wide partition walls 4b having a partition wall thickness T2 of +10% or more to the average partition wall thickness, and narrow partition walls 4c having a partition wall thickness T3 of −10% or less to the average partition wall thickness, in a structure end face 5 (or a structure cross section) perpendicular to an axial direction (see a two-dot chain line in FIG. 1) of a honeycomb axis A of the honeycomb structure 1. Here, the honeycomb structure 1 of the present embodiment is described below by mainly presuming that the honeycomb structure mainly purifies and treats an exhaust gas of a diesel engine. However, the honeycomb structure of the present invention is not limited to the above use application, and needless to say, the honeycomb structure may be used in purifying and treating an exhaust gas of a gasoline engine or the like.

Figure 3:
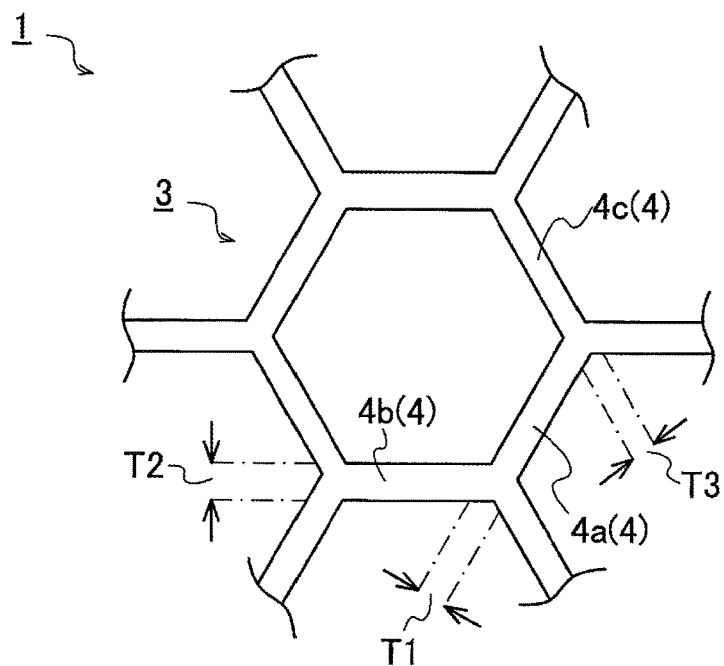
FIG. 3 is an explanatory view schematically showing one example of a hexagonal cell defined by standard partition walls, wide partition walls, and narrow partition walls.

That is, as the partition walls 4, three types of partition walls 4a, 4b and 4c classified in accordance with the partition wall thicknesses T1, T2 and T3 are used, to define the hexagonal cell 3 (see FIG. 3). It is to be noted that to simplify the drawing, in FIG. 1 to FIG. 7, the respective partition wall thicknesses T1, T2 and T3 of the standard partition wall 4a, the wide partition wall 4b and the narrow partition wall 4c are shown in about the same width (excluding FIG. 3).

Figure 4:
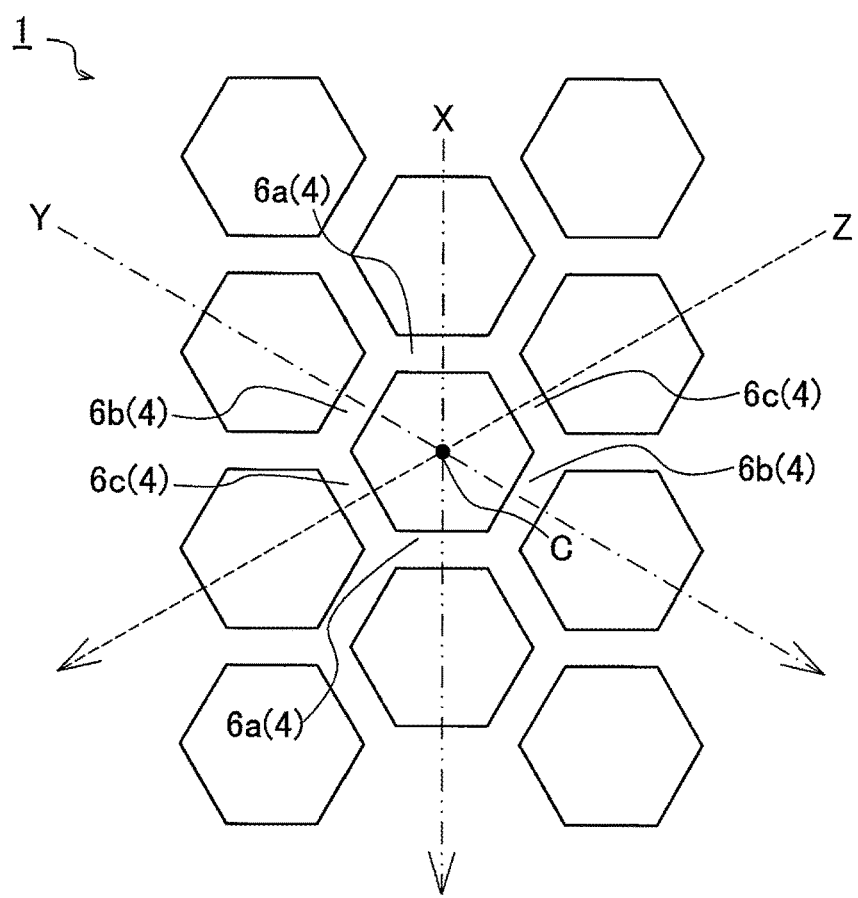
FIG. 4 is an explanatory view schematically showing a constitution of the hexagonal cells and the partition walls.
Figure 5:
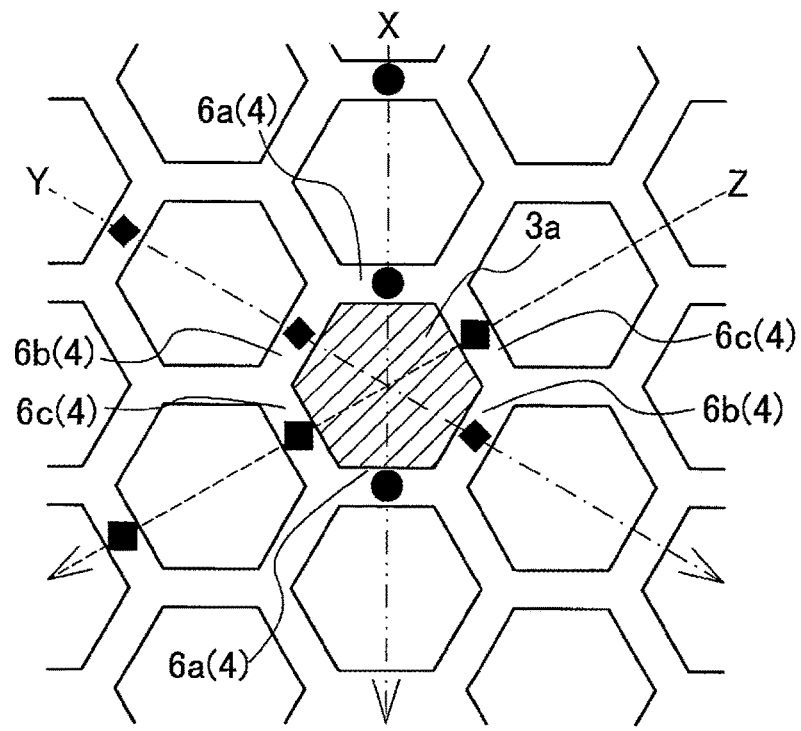
FIG. 5 is an explanatory view showing an arrangement standard of the hexagonal cells and consecutive partition walls.
Figure 6:
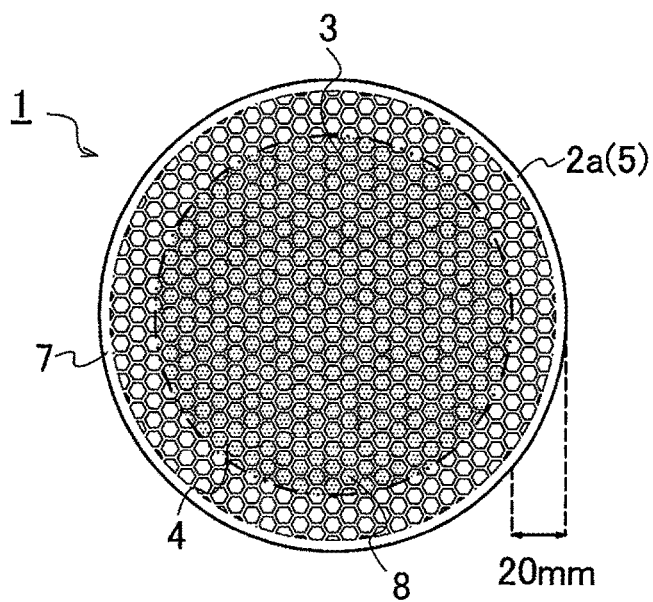
FIG. 6 is an explanatory view illustrating a central region of the honeycomb structure.

Here, the standard partition walls 4a, the wide partition walls 4b and the narrow partition walls 4c are arranged to be randomly distributed in the structure end face 5 or the like in accordance with a predetermined arrangement standard (which will be described later in detail). Here, as shown in FIG. 3 to FIG. 5 or the like, to define one hexagonal cell 3, six (six sides) partition walls 4 are required around the hexagonal cell 3, and one of the standard partition wall 4a, the wide partition wall 4b and the narrow partition wall 4c is disposed in one side.

Furthermore, a non-standard partition wall ratio (=S2/S1× 100) is adjusted into a range of 10% to 30% which is a ratio occupied by a subtotal number S2 of non-standard partition walls which is a total number of the partition walls (the non-standard partition walls) other than the standard partition walls 4a (=the number of the wide partition walls 4b+the narrow partition walls 4c) in a total number S1 of the partition walls 4 which is a total obtained by adding the respective numbers of the standard partition walls 4a, the wide partition walls 4b and the narrow partition walls 4c (=the number of the standard partition walls 4a+the wide partition walls 4b+the narrow partition walls 4c) in the structure end face 5.

The non-standard partition walls (the wide partition walls 4b and the narrow partition walls 4c) in which each of the partition wall thicknesses T2 and T3 deviates as much as ±10% or more from the average partition wall thickness are included in all the partition walls 4 at a certain ratio, thereby making it possible to adjust respective characteristics of temperature raising properties and a heat capacity of the honeycomb structure 1.

The wide partition walls 4b having the partition wall thickness T2 of +10% or more to the average partition wall thickness are included, and hence heat is hard to be removed as compared with the standard partition walls 4a. Therefore, even when there lowers a temperature of the exhaust gas flowing into the honeycomb structure 1 heated by the high-temperature exhaust gas because the diesel engine has a low load, a temperature of the whole honeycomb structure 1 does not rapidly lower, and it is possible to maintain a temperature which is not less than an activation temperature of a catalyst over a long time. Consequently, it is possible to maintain a high purification effect by the catalyst. That is, due to the presence of the wide partition walls 4b, the heat capacity of the honeycomb structure 1 can increase, and the honeycomb structure produces an effect of improving warmth retaining properties.

On the other hand, the narrow partition walls 4c having the partition wall thickness T3 of −10% or less to the average partition wall thickness are included, and hence the temperature raising properties improve as compared with the standard partition walls 4a. Therefore, when the high-temperature exhaust gas flows into the honeycomb structure 1 at start of the diesel engine, the temperature of the honeycomb structure 1 immediately rises from ordinary temperature up to the activation temperature at which the catalyst activates. That is, the temperature at which a catalytic performance is sufficiently exertable is reached in a short time, and hence it is possible to efficiently perform a purifying treatment of the exhaust gas immediately after the start. Due to the presence of the narrow partition walls 4c, the temperature raising properties of the honeycomb structure 1 can improve, and a purification performance is stabilized.

It is to be noted that the presence of the wide partition walls 4b becomes a factor to deteriorate the temperature raising properties of the honeycomb structure 1, whereas the presence of the narrow partition walls 4c becomes a factor to decrease the heat capacity of the honeycomb structure 1. However, in the honeycomb structure 1 of the present embodiment, as described above, the ratio of the subtotal number S2 of the non-standard partition walls which is occupied in the total number S1 of the partition walls 4 is adjusted into the range of 10% to 30%, thereby achieving adjustment of the characteristics which are contradictory to each other, and improving both of the characteristics.

In the honeycomb structure 1 of the present embodiment, the average partition wall thickness is calculated as follows. As shown in FIG. 4 and the like, each of the hexagonal cells 3 of the honeycomb structure 1 is defined by combining a first partition wall pair 6a constituted of a pair of partition walls 4 arranged in parallel with each other, a second partition wall pair 6b constituted of a pair of partition walls 4 which are present at positions shifting as much as an angle of +60° from the first partition wall pair 6a on the basis of a cell center C of the hexagonal cell 3, and a third partition wall pair 6c constituted of a pair of partition walls 4 which are present at positions shifting as much as an angle of −60° from the first partition wall pair 6a on the basis of the cell center C (corresponding to positions shifting as much as an angle of −120° from the second partition wall pair).

At this time, the average partition wall thickness is obtained as an average value by measuring the partition wall thicknesses T1, T2 and T3 of the respective partition walls 4 which are positioned on and intersect respective axes of a first virtual axis X perpendicular to the first partition wall pair 6a, a second virtual axis Y perpendicular to the second partition wall pair 6b, and a third virtual axis Z perpendicular to the third partition wall pair 6c, in the hexagonal cell 3 (hereinafter referred to as "a reference hexagonal cell 3a") which becomes a reference close to a gravity central position of the honeycomb structure 1, i.e., coming in contact with the honeycomb axis A (or positioned in the vicinity of the honeycomb axis) (see FIG. 4). The average partition wall thickness of the partition walls 4 is determined, whereby the respective partition walls 4 can be classified into the standard partition walls 4a, the wide partition walls 4b and the narrow partition walls 4c.

Furthermore, the arrangement standard of the partition walls 4 in the structure end face 5 may be set as follows. That is, the arrangement standard can be set to the effect that "three consecutive partition walls 4 arranged on the respective axes of the virtual axes X, Y and Z include at least one standard partition wall 4a". In other words, the arrangement standard is set to the effect that three consecutively arranged partition walls 4 arranged to intersect the virtual axes X, Y and Z (see each set of "a black circle", "a black rhomboid" and "a black square" in FIG. 5) are not all constituted of the wide partition walls 4b and/or the narrow partition walls 4c, i.e., are not constituted only of the non-standard partition walls. Such an arrangement standard is employed, and hence the standard partition walls 4a, the wide partition walls 4b and the narrow partition walls 4c are randomly scattered to be positioned, respectively, and can define the respective hexagonal cells 3.

As described above, the wide partition walls 4b and the narrow partition walls 4c are different from the standard partition walls 4a in temperature raising performance and heat capacity, respectively. Therefore, in a case where there is present a region in which the non-standard partition walls of the wide partition walls 4b and the narrow partition walls 4c are locally unevenly positioned, the temperature raising performance and heat capacity properties in the region are remarkably different from those of another region. As a result, properties of the honeycomb structure 1 remarkably change. Therefore, the above-mentioned non-standard partition wall ratio is kept in a certain range, and the non-standard partition walls are prevented from being locally present in accordance with the above arrangement standard, thereby making it possible to adjust the temperature raising performance and the heat capacity which are contradictory to each other and to stabilize the purification performance.

Further in the honeycomb structure 1 of the present embodiment, the non-standard partition wall ratio may be calculated by use of the subtotal number S2 of the non-standard partition walls which is occupied in the total number S1 of the partition walls in a central region 8 (see a hatched region in a two-dot chain line circle of FIG. 6) of the honeycomb structure 1 which is positioned inwardly as much as at least 20 mm from a circumferential wall 7 of the honeycomb structure 1.

In a case of employing the honeycomb structure 1 in an exhaust gas purifying device or the like, it is necessary to perform calming of the honeycomb structure in a can member made of a metal. During this canning, there is the possibility that a large external force is applied to the honeycomb structure 1, and the honeycomb structure 1 might break. Therefore, to increase a strength of the partition walls 4 especially in a certain range from the circumferential wall 7 to which the external force is easily applied, the partition wall thickness might change. That is, there might be present a region where the partition wall thickness is locally larger than the average partition wall thickness. Therefore, in the honeycomb structure 1 of the present embodiment, the region of at least 20 mm from the circumferential wall 7 is excluded from a region to calculate the non-standard partition wall ratio, and the region is limited to the central region 8, thereby performing the calculation.

Furthermore, in the honeycomb structure 1, the first average partition wall thickness, the second average partition wall thickness and the third average partition wall thickness in the respective axes of the partition walls 4 positioned on the virtual axes X, Y and Z may be set to a range of ±40% or less to the average partition wall thickness of all the partition walls 4.

The average partition wall thickness of all the partition walls 4 is calculated by the above-mentioned technique. Furthermore, the first average partition wall thickness or the like of each axis is obtained by calculating an average value of the partition walls 4 which are positioned on each axis and intersect the axis. In a case where a deviation to the average partition wall thickness is in excess of ±40% in the first average partition wall thickness and the like in the respective virtual axes X, Y and Z, a region whose strength is locally small or large is present in the honeycomb structure 1. Therefore, in the case that the external force is applied to the honeycomb structure 1, even at a small shearing strength, there is the possibility that breakage occurs from the inside or the like of the honeycomb structure 1, and a practical problem might occur. Thus, when the first average partition wall thickness and the like in the respective axes are set to the above range, it is possible to inhibit decrease of the shearing strength of the honeycomb structure 1.

As described above, in the honeycomb structure 1 of the present embodiment, the partition walls 4 defining the hexagonal cells 3 are constituted by combining the standard partition walls 4a, the wide partition walls 4b and the narrow partition walls 4c having the respective different partition wall thicknesses T1, T2 and T3, and hence the honeycomb structure can be excellent in temperature raising performance and heat capacity.

Hereinafter, examples of the honeycomb structure of the present invention will be described, but the honeycomb structure of the present invention is not limited to these examples.

EXAMPLES (1) Honeycomb Structure

A binder, a surfactant, a pore former, water and others are added to a ceramic raw material to obtain a forming raw material. It is to be noted that as the ceramic raw material for use, a well-known material such as silicon carbide, a Si/SiC based composite material or cordierite is usable, and in the present embodiment, cordierite is used. Furthermore, the binder, the surfactant, the pore former and others are well known, and here detailed description thereof is omitted.

The obtained forming raw material is kneaded to form a kneaded material, and then the material is extruded to form a round or elliptic pillar-shaped honeycomb formed body. In such extrusion, there is used a die in which a partition wall thickness of partition walls defining hexagonal cells, a cell density and the like are predetermined. The extruded honeycomb formed body is dried and fired, thereby completing manufacturing of the honeycomb structure. Table 1 mentioned below shows a shape of the honeycomb structure, a honeycomb diameter (or a honeycomb long diameter and a honeycomb short diameter), a honeycomb length, the cell density and a porosity in each of Examples 1 to 14 and Comparative Examples 1 to 10. Here, honeycomb structures of Examples 11, 12 and 14 and Comparative Examples 5 and 10 possess the elliptic pillar shape, and the other honeycomb structures possess the round pillar shape.

It is to be noted that as to a purification performance and a shearing strength which will be described later, there is the possibility that differences are made in the purification performance and the like among the respective honeycomb structures, in a case where there are differences in the above-mentioned partition wall thickness, cell density, honeycomb diameter, honeycomb length and porosity. Therefore, on conditions that the above parameters are the same, it is necessary to evaluate the purification performance and the shearing strength. Thus, in Table 1 (hereinafter this will also apply to Table 2 and Table 3), the examples and comparative examples in which the above parameters are adjusted to be the same are divided into groups.

Specifically, Comparative Example 1, Examples 1 to 3 and Comparative Example 6 were classified as "group α", Comparative Example 2, Examples 4 to 6 and Comparative Example 7 were classified as "group β", Comparative Example 3, Examples 7 and 8 and Comparative Example 8 were classified as "group γ", Comparative Example 4, Examples 9 and 10, Example 13 and Comparative Example 9 were classified as "group δ", and Comparative Example 5, Examples 11 and 12, Example 14 and Comparative Example 10 were classified as "group ε". Furthermore, in the respective groups α, β, γ, δ and ε, top listed Comparative Example 1, Comparative Example 2, Comparative Example 3, Comparative Example 4 and Comparative Example 5 were defined as references of comparison targets in the groups.

TABLE 1

| | Group | Shape | Honeycomb dia. (mm) | Honeycomb long dia. (mm) | Honeycomb short dia. (mm) | Honeycomb length (mm) | Cell density (cells/cm$^2$) | Porosity (%) |
|---|---|---|---|---|---|---|---|---|
| Example 1 | α | Round pillar-shaped | 105.7 | — | — | 80.0 | 93 | 27 |
| Example 2 | α | Round pillar-shaped | 105.7 | — | — | 80.0 | 93 | 27 |
| Example 3 | α | Round pillar-shaped | 105.7 | — | — | 80.0 | 93 | 27 |
| Example 4 | β | Round pillar-shaped | 93.0 | — | — | 120.0 | 139.5 | 35 |
| Example 5 | β | Round pillar-shaped | 93.0 | — | — | 120.0 | 139.5 | 35 |
| Example 6 | β | Round pillar-shaped | 93.0 | — | — | 120.0 | 139.5 | 35 |
| Example 7 | γ | Round pillar-shaped | 143.8 | — | — | 114.3 | 62 | 50 |
| Example 8 | γ | Round pillar-shaped | 143.8 | — | — | 114.3 | 62 | 50 |
| Example 9 | δ | Round pillar-shaped | 355.6 | — | — | 200.0 | 62 | 35 |
| Example 10 | δ | Round pillar-shaped | 355.6 | — | — | 200.0 | 62 | 35 |
| Example 11 | ε | Elliptic pillar-shaped | — | 228.6 | 137.2 | 155.0 | 46.5 | 35 |
| Example 12 | ε | Elliptic pillar-shaped | — | 228.6 | 137.2 | 155.0 | 46.5 | 35 |
| Example 13 | δ | Round pillar-shaped | 355.6 | — | — | 200.0 | 62 | 35 |
| Example 14 | ε | Elliptic pillar-shaped | — | 228.6 | 137.2 | 155.0 | 46.5 | 35 |
| Comparative Example 1 | α | Round pillar-shaped | 105.7 | — | — | 80.0 | 93 | 27 |
| Comparative Example 2 | β | Round pillar-shaped | 93.0 | — | — | 120.0 | 139.5 | 35 |
| Comparative Example 3 | γ | Round pillar-shaped | 143.8 | — | — | 114.3 | 62 | 50 |
| Comparative Example 4 | δ | Round pillar-shaped | 355.6 | — | — | 200.0 | 62 | 35 |
| Comparative Example 5 | ε | Elliptic pillar-shaped | — | 228.6 | 137.2 | 155.0 | 46.5 | 35 |
| Comparative Example 6 | α | Round pillar-shaped | 105.7 | — | — | 80.0 | 93 | 27 |
| Comparative Example 7 | β | Round pillar-shaped | 93 | — | — | 120.0 | 139.5 | 35 |
| Comparative Example 8 | γ | Round pillar-shaped | 143.8 | — | — | 114.3 | 62 | 50 |
| Comparative Example 9 | δ | Round pillar-shaped | 355.6 | — | — | 200.0 | 62 | 35 |
| Comparative Example 10 | ε | Elliptic pillar-shaped | — | 228.6 | 137.2 | 155.0 | 46.5 | 35 |

(2) Measurement and Calculation of Average Partition Wall Thickness, Etc.

Table 2 mentioned below shows measurement results of an average partition wall thickness of partition walls defining hexagonal cells in each of the honeycomb structures of Examples 1 to 14 and Comparative Examples 1 to 10, and a first average partition wall thickness, a second average partition wall thickness and a third average partition wall thickness in respective virtual axes X, Y and Z including a first virtual axis X and the like of each honeycomb structure. Furthermore, Table 2 also shows a non-standard partition wall ratio (A+B) % calculated on the basis of a ratio A % occupied by wide partition walls indicating a partition wall thickness of +10% or more to the calculated average partition wall thickness, and a ratio B % occupied by narrow partition walls indicating a partition wall thickness of −10% or less to the average partition wall thickness, presence/absence (C) of a constitution in which three consecutive partition walls arranged on the axes of the virtual axes X, Y and Z are non-standard partition walls, a ratio of the C, and a value obtained by subtracting the presence ratio of C from the non-standard partition wall ratio. It is to be noted that the first virtual axis X and the like have already been described, and hence detailed description is omitted here.

According to this table, in each of the honeycomb structures of Examples 1 to 14, the non-standard partition wall ratio (A+B) % which is a ratio occupied by a subtotal number of the non-standard partition walls obtained by adding the wide partition walls and the narrow partition walls to a total number of the partition walls indicates 10% or more, and the three consecutive partition walls are not the non-standard partition wall ratio. In other words, the partition walls include at least one standard partition wall (the presence ratio of C=0%).

On the other hand, in the honeycomb structures of Comparative Examples 1 to 5, the non-standard partition wall ratio is smaller than 10%, and in the honeycomb structures of Comparative Examples 6 to 8, the three consecutive partition walls are constituted of the non-standard partition walls.

TABLE 2

| | Group | Average partition wall thickness (μm) | First average partition wall thickness (X) (μm) | Second average partition wall thickness (Y) (μm) | Third average partition wall thickness (Z) (μm) | Partition wall thickness of +10% or more to average partition wall thickness (μm) | Ratio A (%) occupied by wide partition walls | Partition wall thickness (μm) or less of −10% or more to average partition wall thickness | Ratio B (%) occupied by narrow partition walls | Non-standard partition wall ratio (A + B) (%) | Constitution (C) in which three consecutive partition walls are non-standard partition walls | Presence ratio (%) of C | (A + B) − C (%) |
|---|---|---|---|---|---|---|---|---|---|---|---|---|---|
| Example 1 | α | 68 | 68 | 66 | 70 | 75 | 12 | 61 | 0 | 12 | None | 0 | 12 |
| Example 2 | α | 70 | 72 | 70 | 68 | 77 | 6 | 63 | 5 | 11 | None | 0 | 11 |
| Example 3 | α | 64 | 64 | 64 | 64 | 70 | 2 | 58 | 10 | 12 | None | 0 | 12 |
| Example 4 | β | 90 | 91 | 89 | 90 | 99 | 0 | 81 | 12 | 12 | None | 0 | 12 |
| Example 5 | β | 90 | 90 | 90 | 90 | 99 | 6 | 81 | 6 | 12 | None | 0 | 12 |
| Example 6 | β | 95 | 93 | 95 | 97 | 105 | 3 | 86 | 10 | 13 | None | 0 | 13 |
| Example 7 | γ | 115 | 114 | 114 | 117 | 127 | 4 | 104 | 6 | 10 | None | 0 | 10 |
| Example 8 | γ | 117 | 117 | 113 | 121 | 129 | 10 | 105 | 5 | 15 | None | 0 | 15 |
| Example 9 | δ | 118 | 118 | 118 | 118 | 130 | 5 | 106 | 5 | 10 | None | 0 | 10 |
| Example 10 | δ | 118 | 117 | 118 | 119 | 130 | 7 | 106 | 5 | 12 | None | 0 | 12 |
| Example 11 | ε | 168 | 168 | 170 | 166 | 185 | 6 | 151 | 7 | 13 | None | 0 | 13 |
| Example 12 | ε | 172 | 172 | 173 | 171 | 189 | 5 | 155 | 6 | 11 | None | 0 | 11 |
| Example 13 | δ | 118 | 97 | 138 | 119 | 130 | 7 | 106 | 5 | 12 | None | 0 | 12 |
| Example 14 | ε | 165 | 115 | 170 | 210 | 182 | 7 | 149 | 6 | 13 | None | 0 | 13 |
| Comparative Example 1 | α | 70 | 70 | 70 | 70 | 77 | 3 | 63 | 3 | 6 | None | 0 | 6 |
| Comparative Example 2 | β | 92 | 89 | 93 | 94 | 101 | 1 | 83 | 2 | 3 | None | 0 | 3 |
| Comparative Example 3 | γ | 113 | 113 | 113 | 113 | 124 | 0 | 102 | 8 | 8 | None | 0 | 8 |
| Comparative Example 4 | δ | 118 | 116 | 118 | 120 | 130 | 6 | 106 | 0 | 6 | None | 0 | 6 |
| Comparative Example 5 | ε | 170 | 170 | 170 | 170 | 187 | 2 | 153 | 2 | 4 | None | 0 | 4 |
| Comparative Example 6 | α | 70 | 68 | 70 | 72 | 77 | 6 | 63 | 6 | 12 | Present | 5 | 7 |
| Comparative Example 7 | β | 88 | 89 | 87 | 88 | 97 | 14 | 79 | 0 | 14 | Present | 8 | 6 |
| Comparative Example 8 | γ | 112 | 110 | 114 | 112 | 123 | 2 | 101 | 10 | 12 | Present | 7 | 5 |
| Comparative Example 9 | δ | 117 | 60 | 171 | 119 | 128 | 7 | 105 | 5 | 12 | None | 0 | 12 |
| Comparative Example 10 | ε | 163 | 210 | 210 | 70 | 180 | 7 | 147 | 6 | 13 | None | 0 | 13 |

Furthermore, on the basis of the measured and calculated average partition wall thickness, first average partition wall thickness, second average partition wall thickness and third average partition wall thickness, a ratio (%) of the first average partition wall thickness/the average partition wall thickness, a ratio (%) of the second average partition wall thickness/the average partition wall thickness and a ratio (%) of the third average partition wall thickness/the average partition wall thickness were calculated, to obtain a maximum ratio difference and a minimum ratio difference. Table 3 mentioned below shows the obtained results.

Here, in each of the honeycomb structures of Examples 1 to 10, the first average partition wall thickness and the like have a ratio of ±40% or less to the average partition wall thickness of the partition walls (this also applies to Comparative Examples 1 to 8). On the other hand, in each of the honeycomb structures of Comparative Examples 9 and 10, the first average partition wall thickness and the like have a ratio in excess of ±40% to the average partition wall thickness.

to ε, an example where improvement of 5% or more was recognized in the purification performance was evaluated as "A", an example where the improvement in a range of 2% or more and smaller than 5% was recognized was evaluated as "B", and an example where the improvement in a range smaller than 2% was recognized was evaluated as "C". Table 3 shows the judgment results.

(4) Measurement of Shearing Strength

Figure 7:
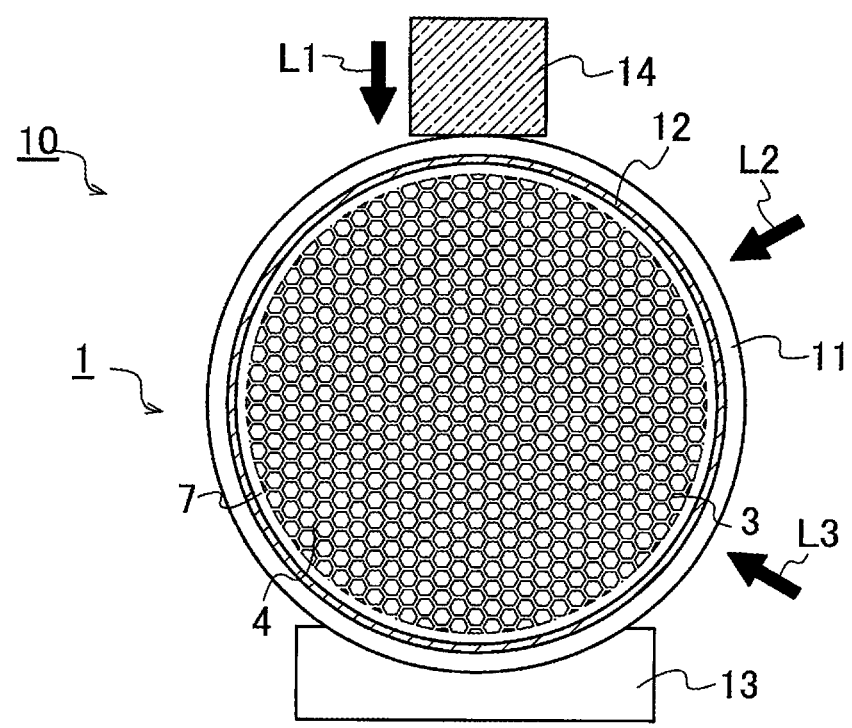
FIG. 7 is an explanatory view explaining one example of a shearing test method.

For each of the honeycomb structures of Examples 1 to 14 and Comparative Examples 1 to 10, measurement of a shearing strength was performed by using a shearing strength tester 10 shown in FIG. 7. Each honeycomb structure 1 was attached to a can member 11 made of a metal in a state where a buffering mat portion 12 was wound around a circumferential wall 7 of the honeycomb structure, thereby preparing a measurement sample. A load was applied to the measurement sample from each of a first loading direction L1, a second loading direction L2, and a third loading direction L3, and a strength at which shearing occurred in the honeycomb structure 1 was measured. To each of the

TABLE 3

| | Group | Ratio of first average partition wall thickness/ average partition wall thickness (%) | Ratio of second average partition wall thickness/ average partition wall thickness (%) | Ratio of third average partition wall thickness/ average partition wall thickness (%) | Maximum ratio difference (%) | Minimum ratio difference (%) | Purification performance | Shearing strength |
|---|---|---|---|---|---|---|---|---|
| Example 1 | α | 100 | 97 | 103 | +3 | −3 | A | A |
| Example 2 | α | 103 | 100 | 97 | +3 | −3 | B | A |
| Example 3 | α | 100 | 100 | 100 | 0 | 0 | A | A |
| Example 4 | β | 101 | 99 | 100 | +1 | −1 | A | A |
| Example 5 | β | 100 | 100 | 100 | 0 | 0 | A | A |
| Example 6 | β | 98 | 100 | 102 | +2 | −2 | A | A |
| Example 7 | γ | 99 | 99 | 102 | +2 | −1 | B | A |
| Example 8 | γ | 100 | 97 | 103 | +3 | −3 | A | A |
| Example 9 | δ | 100 | 100 | 100 | 0 | 0 | B | A |
| Example 10 | δ | 99 | 100 | 101 | +1 | −1 | A | A |
| Example 11 | ε | 100 | 101 | 99 | +1 | −1 | A | A |
| Example 12 | ε | 100 | 101 | 99 | +1 | −1 | A | A |
| Example 13 | δ | 82 | 117 | 101 | +17 | −18 | A | B |
| Example 14 | ε | 70 | 103 | 127 | +27 | −30 | A | B |
| Comparative Example 1 | α | 100 | 100 | 100 | 0 | 0 | C | A |
| Comparative Example 2 | β | 97 | 101 | 102 | +2 | −3 | C | A |
| Comparative Example 3 | γ | 100 | 100 | 100 | 0 | 0 | C | A |
| Comparative Example 4 | δ | 98 | 100 | 102 | +2 | −2 | C | A |
| Comparative Example 5 | ε | 100 | 100 | 100 | 0 | 0 | C | A |
| Comparative Example 6 | α | 97 | 100 | 103 | +3 | −3 | C | A |
| Comparative Example 7 | β | 101 | 99 | 100 | +1 | −1 | C | A |
| Comparative Example 8 | γ | 98 | 102 | 100 | +2 | −2 | C | A |
| Comparative Example 9 | δ | 51 | 147 | 102 | +47 | −49 | A | C |
| Comparative Example 10 | ε | 129 | 129 | 43 | +29 | −57 | A | C |

(3) Measurement of Purification Performance

Each of the honeycomb structures according to the above examples and comparative examples was attached to an exhaust gas purifying device, and the device was attached to an exhaust system of a car in which a direct injection type gasoline engine having a displacement of 2.0 liters was mounted. Afterward, a vehicle test was performed and the purification performance was judged with a chassis dynamometer in JC08 mode. To each of Comparative Examples 1 to 5 which were the references in the respective groups α honeycomb structures of Comparative Examples 1 to 5 which were the references in the respective groups α to ε, a level at which an equivalent or more shearing strength was acquired in each of the directions L1, L2 and L3 was evaluated as "A", a passing level at which the shearing strength was uneven in each direction L1 or the like but there were not any practical problems was evaluated as "B", and a level at which large decrease of the shearing strength was recognized was evaluated as "C". Table 3 shows the evaluation results.

(5) Evaluation Results

As shown in Table 3, each of the honeycomb structures of Examples 1 to 14 indicated the evaluation of at least "B" in evaluation items of the purification performance and the shearing strength, and it has been confirmed that the honeycomb structure does not have any practical problems in a case of use in the exhaust gas purifying device or the like. That is, when a honeycomb structure has at least 10% of non-standard partition walls having a partition wall thickness of ±10% or more to an average partition wall thickness and the non-standard partition walls are randomly arranged to define hexagonal cells, the honeycomb structure indicates a stabilized purification performance and can maintain a high shearing strength. When a partition wall thickness of the partition walls defining the hexagonal cells is changed, it is possible to improve a temperature raising performance of the honeycomb structure, and it is possible to long continue a state which is not less than an activation temperature of a catalyst, due to a high heat capacity. Furthermore, it has been confirmed that even when the honeycomb structure has a round pillar shape or an elliptic pillar shape, similar effects are produced.

In a case where the non-standard partition wall ratio of the honeycomb structure was smaller than 10% (Comparative Examples 1 to 5), it was recognized that the purification performance remarkably deteriorated. As described above, it was further confirmed that the non-standard partition wall ratio was not less than a certain ratio. Additionally, similarly in a case of a honeycomb structure including a region where the non-standard partition wall ratio was smaller than 10% and three consecutive partition walls were all non-standard partition walls (Comparative Examples 6 to 8), the deterioration of the purification performance was recognized (for each case, refer to Table 3).

The respective groups which are respective comparison targets will be described in detail. For example, in the case of the group α, to Comparative Example 1 (=6%) where the non-standard partition wall ratio was smaller than ±10%, each of the purification performances of Example 1 (=12%), Example 2 (=11%) and Example 3 (=12%) where the non-standard partition wall ratio was ±10% or more which satisfied conditions of the present invention had evaluation "A" because purification performance improvement of 5% or more from a value of Comparative Example 1 was recognized. Furthermore, in a case of Comparative Example 6 where a parameter such as a cell density was about the same as in Examples 1 to 3 but three consecutive partition walls were constituted of non-standard partition walls and a presence ratio of C was 5%, the evaluation was "C" because the improvement of the purification performance was smaller than 2% as compared with Comparative Example 1. That is, as described above, in the honeycomb structure of the hexagonal cells which satisfies the conditions that the honeycomb structure has at least 10% of the non-standard partition walls having the thickness of ±10% or more to the average partition wall thickness and that the non-standard partition walls are randomly arranged, it has been confirmed that the honeycomb structure indicates an excellent purification performance as compared with the honeycomb structure of Comparative Example 1 of the reference. A similar tendency was recognized also in the other groups β to ε.

On the other hand, in the evaluation of the shearing strength, as shown in Comparative Example 9 of the group δ and Comparative Example 10 of the group ε, the above improvement of the purification performance was recognized, and there were satisfied the conditions that the non-standard partition wall ratio was ±10% or more to Comparative Example 4 or 5 of the reference and that three consecutive partition walls were not constituted of the non-standard partition walls. Also in this case, when the ratio of one of the first average partition wall thickness, the second average partition wall thickness and the third average partition wall thickness was in excess of ±40% to the average partition wall thickness (see Table 3), the purification performance improved as compared with Comparative Example 4 or Comparative Example 5, and a suitable evaluation was obtainable, but as compared with the reference, the decrease of the shearing strength was indicated and a low evaluation was only obtainable.

A honeycomb structure of the present invention is especially advantageously usable in a use application of an exhaust gas purifying treatment device or the like which performs a purifying treatment of particulate matter of particulates or the like included in fluid of an exhaust gas or the like emitted from a diesel engine, a gasoline engine or the like.

DESCRIPTION OF REFERENCE NUMERALS

1: honeycomb structure, 2a: one end face, 2b: the other end face, 3: hexagonal cell, 3a; reference hexagonal cell, 4: partition wall, 4a: standard partition wall, 4b: wide partition wall, 4c: narrow partition wall, 5: structure end face, 6a: first partition wall pair, 6b: second partition wall pair, 6c: third partition wall pair, 7: circumferential wall, 8: central region, 10: shearing test device, 11: can member, 12: mat portion, 13: support base, 14: load supply portion, A: honeycomb axis, C: cell center, L1: first loading direction, L2: second loading direction, L3: third loading direction, S1: total number of partition walls, S2: subtotal number of non-standard partition walls, X: first virtual axis, Y: second virtual axis, and Z: third virtual axis.

What is claimed is:

1. A honeycomb structure comprising:
   partition walls defining a plurality of hexagonal cells which possess a hexagonal shape, extend from one end face to an other end face and become through channels for fluid,
   wherein the partition walls are constituted by combining:
   standard partition walls having a partition wall thickness in a range smaller than ±10% to an average partition wall thickness of the partition walls,
   wide partition walls having a partition wall thickness of +10% or more to the average partition wall thickness, and
   narrow partition walls having a partition wall thickness of −10% or less to the average partition wall thickness, and
   a non-standard partition wall ratio is in a range of 10% to 30% which is a ratio occupied by a subtotal number of non-standard partition walls obtained by adding the wide partition walls and the narrow partition walls to a total number of the partition walls which is obtained by adding the numbers of the standard partition walls, the wide partition walls and the narrow partition walls.

2. The honeycomb structure according to claim 1, wherein the standard partition walls, the wide partition walls and the narrow partition walls are arranged to be randomly distributed in accordance with a directed arrangement standard in a structure cross section perpendicular to an axial direction of the honeycomb structure.

3. The honeycomb structure according to claim 1,
wherein the hexagonal cell is defined by:
a first partition wall pair constituted of a pair of partition walls arranged in parallel with each other,
a second partition wall pair constituted of a pair of partition walls which are present at positions shifting as much as an angle of +60° from the first partition wall pair on the basis of a cell center of the hexagonal cell, and
a third partition wall pair constituted of a pair of partition walls which are present at positions shifting as much as an angle of −60° from the first partition wall pair on the basis of the cell center of the hexagonal cell, and
the average partition wall thickness is an average value of the partition wall thicknesses of the partition walls which are positioned on respective axes of a first virtual axis perpendicular to the first partition wall pair, a second virtual axis perpendicular to the second partition wall pair, and a third virtual axis perpendicular to the third partition wall pair, in the hexagonal cell close to a gravity central position of the honeycomb structure.

4. The honeycomb structure according to claim 2,
wherein in the arrangement standard, three consecutive partition walls arranged on the respective axes of the first virtual axis, the second virtual axis and the third virtual axis include at least one standard partition wall.

5. The honeycomb structure according to claim 1,
wherein the non-standard partition wall ratio is obtained by calculating a subtotal number of the non-standard partition walls which is occupied in the total number of the partition walls in a central region of the honeycomb structure which is positioned inwardly as much as at least 20 mm from a circumferential wall of the honeycomb structure.

6. The honeycomb structure according to claim 3,
wherein in the partition walls positioned on the respective axes of the first virtual axis, the second virtual axis and the third virtual axis, a first average partition wall thickness, a second average partition wall thickness and a third average partition wall thickness in the respective axes are in a range of ±40% to the average partition wall thickness of the partition walls.

* * * * *